(No Model.)
T. SHIPLEY.
WATER PURIFIER FOR ICE MACHINES.
No. 576,416. Patented Feb. 2, 1897.
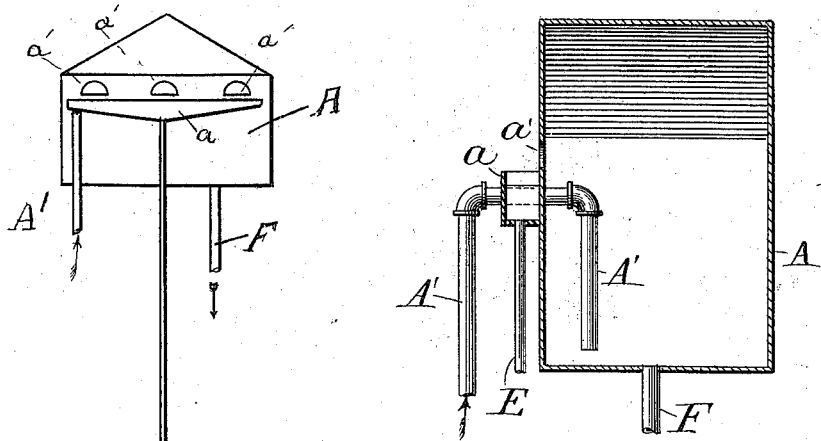
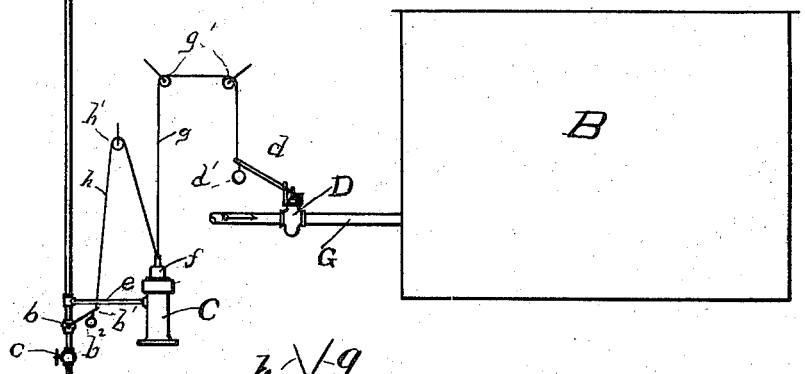
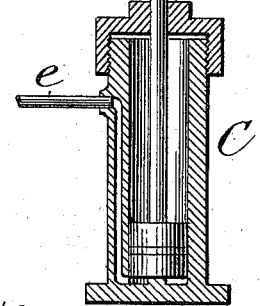
WITNESSES:
Emma Lyford
Hattie C. Brown
INVENTOR
Thomas Shipley
BY
Geo. J. Murray
ATTORNEY.

UNITED STATES PATENT OFFICE.

THOMAS SHIPLEY, OF PITTSBURG, PENNSYLVANIA, ASSIGNOR OF ONE-HALF TO LOUIS J. DOLLE, OF CINCINNATI, OHIO.

WATER-PURIFIER FOR ICE-MACHINES.

SPECIFICATION forming part of Letters Patent No. 576,416, dated February 2, 1897.

Application filed December 26, 1895. Serial No. 573,400. (No model.)

*To all whom it may concern:*

Be it known that I, THOMAS SHIPLEY, a citizen of the United States, and a resident of Pittsburg, in the county of Allegheny and State of Pennsylvania, have invented certain new and useful Improvements in Water-Purifiers for Ice-Machines, of which the following is a specification.

My invention relates to the manufacture of ice from distilled water, and particularly to means to free the water after it leaves the condensers of any floating impurities before it is conveyed to the coolers and storage tank or reservoir.

The invention consists in providing means by which the overflow or skim from the reboiler or skim-tank is utilized to automatically deliver the purified water to the coolers and storage-tank; and it consists in means hereinafter described, illustrated in the accompanying drawings, and particularly referred to and pointed out in the claims.

In the drawings, Figure 1 is a side elevation of so much of a distilled-water supply for ice-machines as is necessary to illustrate my invention. Fig. 2 is a detail view, in central vertical section, of the reboiler or skim-tank with its connecting-pipes. Fig. 3 is a view in axial section of the trap controlling the flow of water from the reboiler or skim-tank to the cooler or storage-tank.

Referring to the drawings, A is a reboiler or skim-tank, which may be of any approved construction; A', a pipe leading into the skim-tank from the condensers, (not shown;) F, a pipe leading from the bottom of the reboiler or skim-tank to the filters and coolers, (not shown, but which may be of any well-known construction,) and G a pipe to convey the distilled water from the coolers and filters to the storage-tank B.

$a$ is a skimming dish or trough secured to the side of the skimming-tank near its top and underneath the overflow-orifices $a'$. A discharge-pipe E is connected to the center or deepest part of the trough $a$ and near its lower end is provided with a valve $b$, and below this valve the pipe is provided with a regulating-valve $c$.

The pipe E above the valve $b$ is connected to a trap C by a branch pipe $e$. The trap shown in the drawings is a simple hydraulic cylinder with a plunger or piston $f$, which passes up through the cap of the cylinder. The cap, which is removable, prevents the piston or plunger from being entirely withdrawn from the cylinder. To the upper end of the piston $f$ are connected chains or ropes $g$ and $h$, which pass over sheaves or pulleys $g'$ and $h'$ and have their opposite ends the one $h$ connected to a lever $b'$, which actuates the valve $b$, and the other, $g$, connected to a lever $d$, which actuates a gate or valve D, which valve controls the flow of water from the coolers and filters through pipe G to the reservoir B. When the piston $f$ of the trap is in its lower position, both the valves $b$ and D are closed, and when the chains $g$ and $h$ are relaxed by the elevation of the piston $f$ the weights $b^2$ and $d'$, which are hung upon the ends of the levers $b'$ and $d$, carry the levers down and open said valves.

When the water in the reboiler or skim-tank A rises to the apertures $a'$, the floating impurities overflow into the dish or trough $a$, and, being carried down through the pipe E, pass into the cylinder of the trap C below the piston or plunger $f$. The weight of the column elevates the piston, and both the valves $b$ and D are opened by their weighted levers and remain open until the column of water in pipe E is discharged through the regulating-valve $c$. So long as these valves are open the water from the tank A flows into the coolers and filters and from them into the storage-tank B, of course lowering the water in tank A below the level of the overflow into the dish or trough $a$.

The extent to which the water may be lowered in tank A is regulated by the valve $c$, which by opening more or less determines the time necessary to drain the pipe E when the valve $b$ is open. So soon as the pipe E and trap are drained the weight of the piston carries it to its lowest position and through chains $g$ and $h$ elevates the levers $b'$ and $d$ and again closes the valves $b$ and D and retains them in the closed position until the water in the tank A again overflows into the dish or trough $a$ and through pipe E into the trap, as before described.

I have shown my invention in what I believe to be its best and simplest form; but it will be obvious to those skilled in the art that it may be modified in minor structural details, and hence I shall consider all mere mechanical variations as within its spirit and scope.

What I claim is—

1. In a water-purifier for ice-machines, the combination of the skimming-tank, a pipe to convey the distilled water to said tank, the reservoir, a discharge-pipe leading from the tank to the reservoir, a gate or valve in said pipe, an overflow dish or trough at the upper end of the skimming-tank, a trap having a piston therein, an overflow-pipe connecting the skimming-dish and trap, and means such as shown for connecting the piston of the trap with the supply-valve for the reservoir, whereby said valve is automatically opened by the skimmed water flowing into the trap, and closed when the trap is drained, substantially as shown and described.

2. The combination of the reboiler or skimming-tank, an overflow-pipe connected thereto near its upper end, a valve in the overflow-pipe, a trap having a piston connected to the overflow-pipe between the valve and skimming-tank, a reservoir, a pipe for the distilled water from the skimming-tank to the reservoir, a valve within said pipe, and connections between the trap-piston and the valves, substantially as described.

3. The skimming-tank, an overflow-pipe, leading therefrom, a valve arranged in the lower end of said pipe, a regulating-cock below said valve, a trap connected with the overflow-pipe above the valve, a storage tank or reservoir, a pipe to convey the distilled water from the skimming-tank to said reservoir, a valve in said pipe, and connections between the trap and the respective valves, combined and arranged substantially as set forth.

4. The combination of the reboiler or skimming-tank, the trap having a piston therein, an overflow-pipe connecting the upper end of said tank and trap, a storage tank or reservoir, a supply-pipe for the distilled water from the skimming-tank to said reservoir, a valve within said pipe, a weighted lever to open said valve, a pulley above said lever, a chain passing over said pulley and having one end connected to a lever and the opposite end to the piston of the trap, whereby the valve is opened when the piston is elevated and closed by the weight of the piston when it falls to its lower position, substantially as shown and described.

THOMAS SHIPLEY.

Witnesses:
J. L. CLARK,
JOHN KURTZ.